April 14, 1970 J. D. ZOOK 3,506,335
LIGHT DEFLECTING DEVICE
Filed March 29, 1968 2 Sheets-Sheet 1
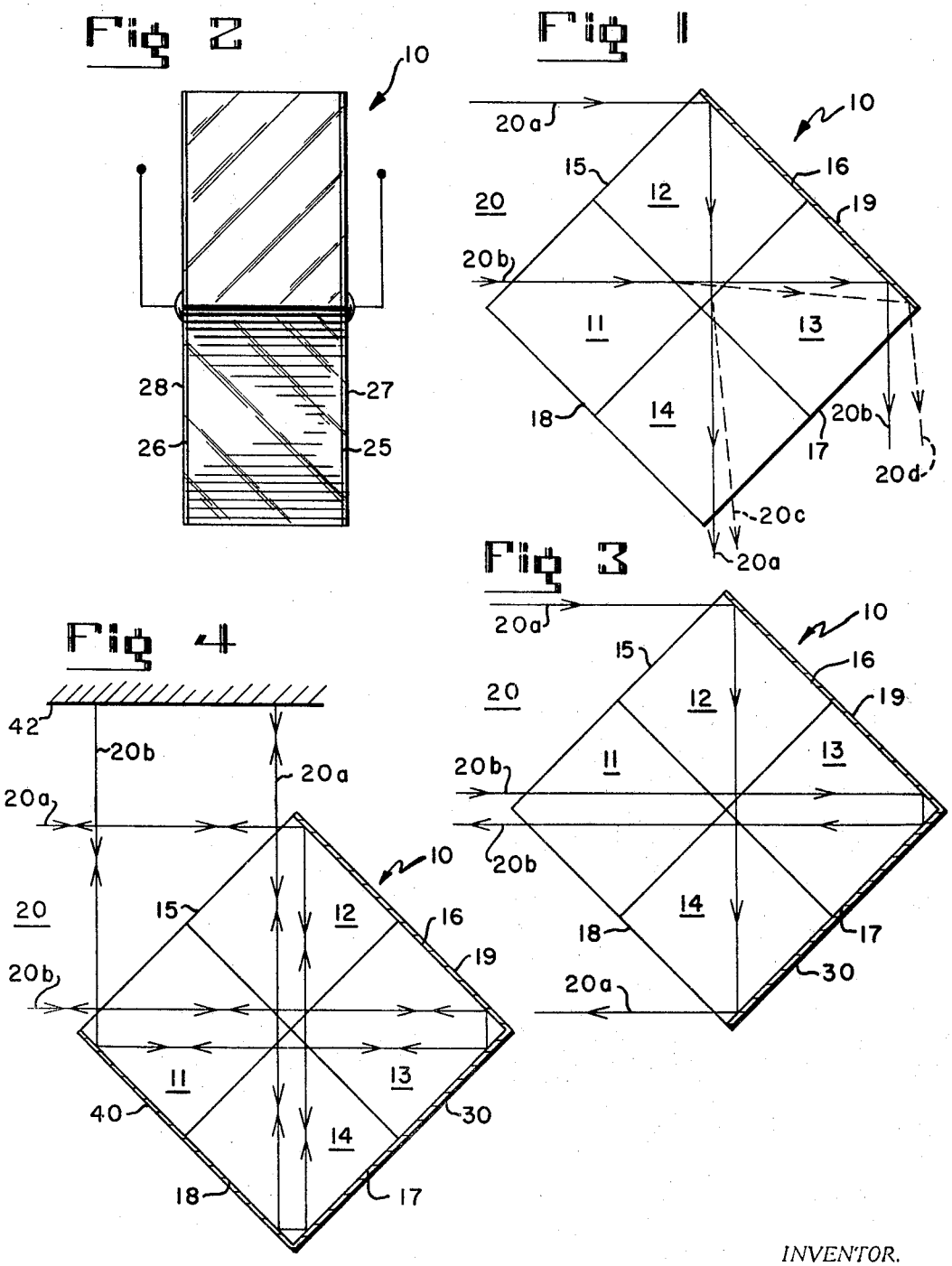
INVENTOR.
JAMES D. ZOOK
BY
ATTORNEY.

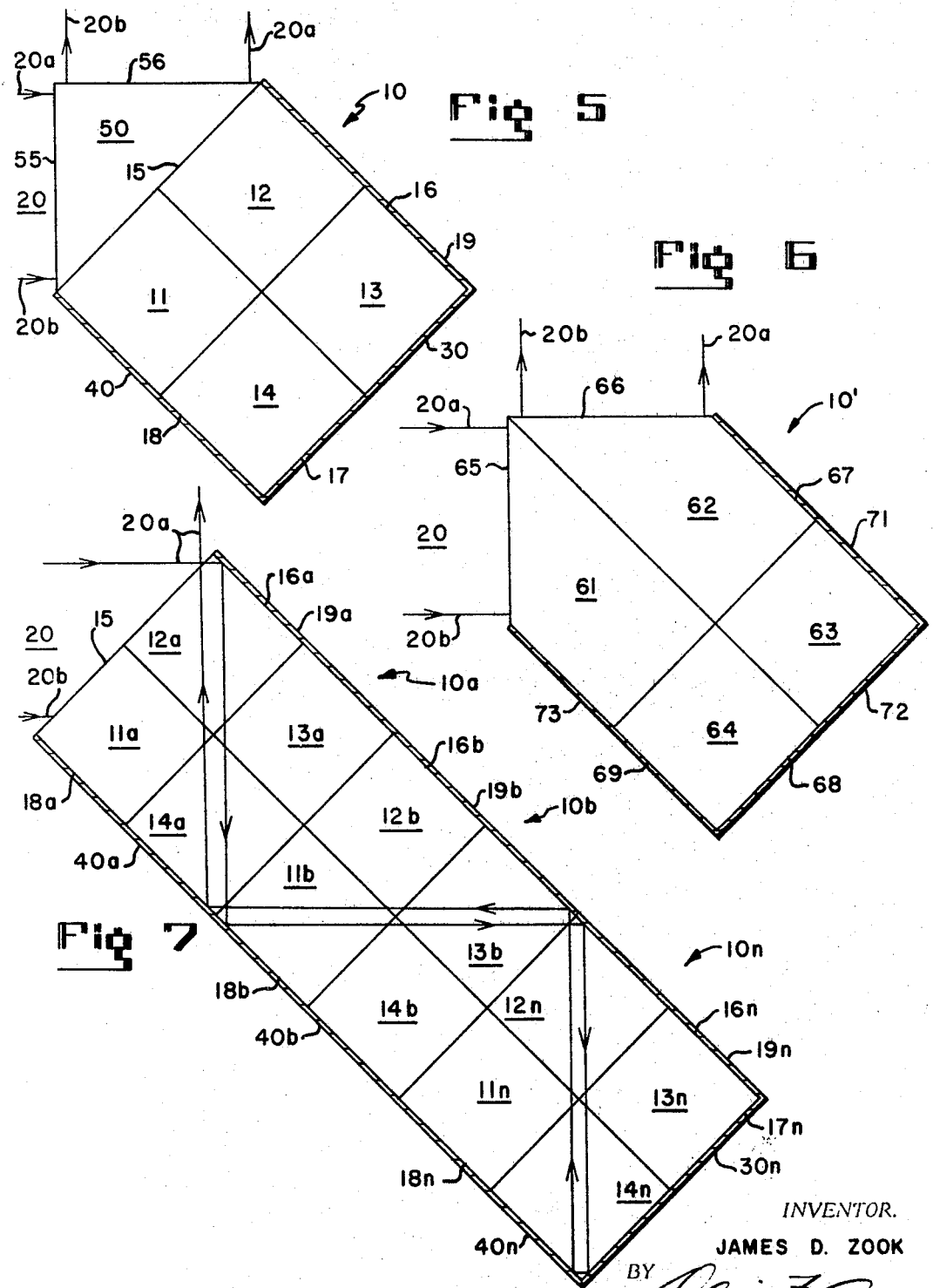

United States Patent Office 3,506,335
Patented Apr. 14, 1970

3,506,335
LIGHT DEFLECTING DEVICE
James D. Zook, Burnsville, Minn., assignor to Honeywell Inc., Minneapolis, Minn., a corporation of Delaware
Filed Mar. 29, 1968, Ser. No. 717,322
Int. Cl. G02f 1/16, 1/34
U.S. Cl. 350—160
12 Claims

ABSTRACT OF THE DISCLOSURE

An electro-optic (E-O) light beam deflector having four adjacent light transparent regions. The index of refraction of at least one of the regions is varied by application of an electric field. Light directing means are provided to direct the light beam along a predetermined path within the deflector, whereby an incident light beam is deflected whenever it passes between two regions having different indices of refraction. An array of deflectors to achieve cumulative deflection is also disclosed.

BACKGROUND OF THE INVENTION

This invention relates to a light deflector for controlling the position of a light beam. Light deflectors which achieve deflection by passing a light beam from a first region having a first index of refraction into a second region having a second index of refraction are known in the art. A refinement of this basic principle provides reflective means for passing the light beam through the two regions having different indices of refraction a plurality of times. However, these prior art deflectors do not make optimum use of the E-O crystal. That is, the number of resolvable spots and total deflection angle is not maximized for a given volume of crystal. This disadvantage was removed in an invention by Tzuo-Chang Lee and is described in co-pending patent application Ser. No. 668,912, which is assigned to the same asignee as the present application. However, since the Lee configuration does not minimize the number of faces which require polishing, this deflector is still relatively expensive.

SUMMARY OF THE INVENTION

The light beam deflector of the present invention is a light transparent body having four adjacent regions. At least one of these regions has an electric field dependent index of refraction. A first face of the body is adapted to transmit an incident light beam into the body. Reflective means then direct the light beam along a predetermined path within the body. Upon application of an electric field to a region having an electric field dependent index of refraction, the light beam traversing the body is deflected upon entering and exiting this region.

The preferred embodiment of this invention includes at least one substantially parallelepiped region. The parallelepiped region is either an actual parallelepiped body or it is that portion of a larger body that provides a parallelepiped region even though the larger body is not in the shape of a parallelepiped. The parallelepiped configuration provides the same number or resolvable spots and deflection angle as do two of the triangular composite prisms described in the aforementioned patent application, provided the combined volume of the two composite triangular prisms equals the volume of the parallelepiped configuration. Thus, the present invention provides all the advantages obtained from the aforementioned co-pending patent application and provides an additional advantage by reducing the number of surfaces which need to be polished. Furthermore, the fact that the faces are substantially parallel also facilitates polishing. As will be described hereinbelow, the basic light beam deflector may be incorporated in an array to provide cumulative deflection.

BRIEF DESCRIPTION OF THE DRAWING

FIGURE 1 is a diagrammatic view of a preferred embodiment of the light beam deflector having a reflective coating on one face;

FIGURE 2 is a left side view of the deflector shown in FIGURE 1;

FIGURE 3 is a diagrammatic view of an other preferred embodiment of the light beam deflector having a reflective coating on two faces;

FIGURE 4 is a diagrammatic view of yet another preferred embodiment of the light beam deflector having a reflective coating on three faces;

FIGURE 5 is a diagrammatic view illustrating the utilization of a right triangular prism to prevent refraction of a light beam incident face 15;

FIGURE 6 is a diagrammatic view illustrating yet another embodiment to prevent refraction of a light beam incident face 15 of FIGURE 1, and FIGURE 7 is a diagrammatic view of an array of light beam deflectors arranged to provide cumulative deflection.

DESCRIPTION OF THE PREFERRED EMBODIMENTS

Shown in FIGURES 1 and 2 is a light transparent body, generally designated 10, in the form of a rectangular parallelepiped. Body 10 is composed of first, second, third and fourth regions, designated 11, 12, 13 and 14 respectively. As shown, regions 11 and 13 are each adjacent regions 12 and 14. The cross section of light transparent body 10 is preferably square. That is, faves 15, 16, 17 and 18 are of equal area. Thus, first and second bases 25 and 26 are square. In the embodiment shown, regions 11, 12, 13 and 14 are in the form of distinct, substantially identical, rectangular parallelepipeds. The bases, of parallelepipeds 11, 12, 13 and 14, are square. That is, the area shown in FIGURE 1 of parallelepipeds 11, 12, 13 and 14 is square. However, an embodiment in which body 10 is a single crystal will also achieve deflection. In this embodiment, the regions corresponding to regions 11–14 are not actual parallelepiped bodies, but for purposes of achieving deflection and for discussion hereinbelow these regions will also be considered parallelepipeds.

As shown in FIGURE 2, electrodes 27 and 28 are attached to bases 25 and 26, respectively, in a manner which is well known in the art. The electrodes provide a means for applying an electric field to body 10. As shown, electrodes 27 and 28 cover the entire surface area of bases 25 and 26. However, it is only necessary to electrode one of the parallelepiped regions to make the deflector operational. Furthermore, multiple electrodes may be provided to apply separate electric fields to the parallelepiped regions. For example, if parallelepipeds 11–14 are composed of material possessing a quadratic E-O effect, such as lead magnesium niobate ($Pb_3MgNB_2O_9$), separate electrodes would normally be provided to enable a voltage of one polarity with respect to a given bias voltage to be applied to parallelepipeds 11 and 13 and a voltage of opposite polarity with respect to the same given bias voltage to parallelepipeds 12 and 14. This electroding technique provides a linear relationship between the light beam deflection angle and the applied electric field. Alternatively, a linear relationship is also achieved between the light beam deflection angle and a small electric field of the same polarity superimposed on a large biasing field. The biasing field is of one polarity for parallelepipeds 11 and 13 and of an opposite polarity for parallelepipeds 12 and 14.

In the embodiments illustrated (FIGURES 1–7), the four regions composing the light transparent body are composed of the same E-O material. Furthermore, in the embodiments shown the crystallographic C-axes of adjacent parallelepipeds are oppositely oriented. Thus, in FIGURE 1 if the C-axis of parallelepipeds 11 and 13 is out of the drawing then the C-axis of parallelepipeds 12 and 14 is into the drawing. When an electric field is applied by electrodes 27 and 28, the index of refraction becomes $N_0+\Delta N$ for parallelepipeds 12 and 14 and $N_0-\Delta N$ for parallelepipeds 11 and 13, where $\Delta N$ is either positive or negative and $N_0$ is the index of refraction without an applied electric field. However, in an embodiment where the four regions of the light transparent body are not crystallographically separate and distinct, the crystallographic C-axis is of course in the same direction for the entire crystal. In this case, electrodes are placed on the area of bases 25 and 26 corresponding to the area formed by the bases of parallelepipeds 12 and 14 as shown in FIGURE 1. However, electrodes are not placed on the area corresponding to the bases of parallelepipeds 11 and 13. Using this partial electroding technique, the index of refraction in the regions corresponding to parallelepipeds 12 and 14 changes relative to the index of refraction in parallelepiped region corresponding to 11 and 13 upon application of an electric field. Alternatively, the four regions composing the light transparent body could also be composed of different E-O material or by E-O material without a crystallographic C-axis if means to apply the proper electric field is provided.

Reflective coating 19 on face 16 provides a light directing means which establishes a path for a light beam within the body. That is, light beam incident first face 15, formed by parallelepipeds 11 and 12, will traverse the body along a first path until it is intercepted by reflective coating 19 on second face 16. Reflective coating 19 redirects the light beam along a second path and the light beam exits the body through third face 17.

In operation, a light beam generally designated 20 is incident first face 15. Since it is preferred to have light beam 20 incident reflective coating 19 on second face 16 at a 45° angle, the angle of refraction at first face 15 must also be 45°. Without compensation for the occurrence of refraction, light beam 20 will be refracted at an angle other than 45° at face 15. However, the 45° refraction angle may be achieved by surrounding the portion of the body 10 receiving the incident beam with a material having an index of refraction similar to the body. This material may be solid or liquid. Surrounded by such a material, a light beam incident face 15 at a 45° angle will provide the desired 45° angle of incidence at reflective coating 19. For purposes of discussion, it is to be assumed that the deflectors shown in FIGURES 1–4 and the array of deflectors shown in FIGURE 7 are surrounded by such a medium (not shown). Alternative approaches for providing a 45° angle of refraction at face 15 are discussed in conjunction with FIGURES 5 and 6.

The incident light beam must be polarized substantially perpendicular to the plane of the drawing if deflection is to be achieved. In the embodiments shown, light beam 20 is composed of numerous light rays of which rays 20a and 20b are the two extreme rays bounding the beam in the plane of the drawing. It is preferable that the cross section of light beam 20 be approximately the same area as rectangular face 15. Therefore, oppositely disposed outer rays 20a and 20b are as near the upper and lower edges of face 15 as feasible. Thus, when an electric field is applied, the path of extreme rays 20a and 20b have different indices of refraction for nearly their entire traversal of the light transparent body. This situation maximizes the optical path differences (O.P.D.) between extreme rays 20a and 20b. In this discussion, the O.P.D. equals $\Delta nL$ where $\Delta n$ is the relative difference in indices of refraction along the paths of extreme rays 20a and 20b, and L is the path length of rays 20a and 20b within body 10. It can be shown that the O.P.D. is directly proportional to the number of resolvable spots and total deflection angle obtainable. Therefore, maximization of the O.P.D. maximizes the number of resolvable spots and deflection angle obtainable with a given volume of E-O crystal. Thus, the embodiment shown in FIGURE 1 is basic to a light beam deflector which minimizes the volume of crystal necessary to provide a given number of resolvable spots and total deflection angle. Furthermore, the embodiment provides the additional advantage of minimizing the number of faces which need to be polished.

Following extreme light rays 20a and 20b through the light transparent body will exemplify the principle of operation. Light ray 20a is incident near the upper edge of face 15 and traverses parallelepiped 12 until being intercepted by reflective coating 19 on second face 16. The reflective coating redirects the light beam toward third face 17. Before exiting body 10 through third face 17, the light ray traverses parallelepiped regions 12, 13 and 14 as illustrated. Oppositely disposed extreme ray 20b traverses body 10 in a similar manner except that this ray traverses parallelepiped regions 11, 12 and 13. Without an electric field applied, the parallelepipeds 11, 12, 13 and 14 have similar indices of refraction and deflection does not occur as the light beam traverses the body from one region to another. The case where an electric field is not applied and cases analogous to it are hereafter referred to as the undeflected state.

When an electric field is applied by means of electrodes 27 and 28, the index of refraction for each parallelepiped changes as previously described. In this case, the light beam is deflected as it traverses from one parallelepiped to each adjacent parallelepiped due to the difference in the indices of refraction of the adjacent parallelepipeds. The light beam is illustrated in a deflected state by dotted rays 20c and 20d. As illustrated, the path of ray 20a is nearly entirely in parallelepipeds 12 and 14 which have a first index of refraction and the path of ray 20b is nearly entirely in parallelepipeds 11 and 13 which have a second index of refraction when an electric field is applied. Thus, as previously stated the O.P.D. between the two extreme rays is maximized and the number of resolvable spots and total deflection angle obtainable are therefore maximized for a given beam width inside body 10.

FIGURES 3–6 have been simplified by illustrating the light beam in only the undeflected state. Since the manner in which deflection occurs is apparent, the complete operation of the invetnion is readily understandable.

The embodiment shown in FIGURE 3 is identical to the deflector illustrated in FIGURE 1 except for the addition of a second reflective coating 30 on third face 17. The addition of reflective coating 30 reedirects the light beam towards fourth face 18. The light beam is shown exiting the body through face 18 in an undeflected state. With an electric field applied to body 10, the light beam is deflected upon traversal from a parallelepiped having one index of refraction to another parallelepiped having a different index of refraction. Since reflective coating 30 redirects the extreme rays along paths having different indices of refraction for nearly the entire traversal of the body, the O.P.D. is further increased. Hence, the number of resolvable spots and total deflection angle obtainable is increased.

The embodiment shown in FIGURE 4 is identical to the deflector illustrated in FIGURE 3 except for the addition of a third reflective coating 40 on face 18. The addition of reflective coating 40 redirects light beam 20 toward first face 15 where it exits body 10. Again, the light beam is deflected as it traverses from one parallelepiped to an adjacent parallelepiped when an electric field is applied. Reflective coating 40 further redirects the two extreme rays along paths having different indices of refraction for nearly their entire traversal of the body. Thus with an electric field applied, the O.P.D. between the two extreme rays is further increased. The O.P.D. and correspondingly the number of resolvable spots and total deflection angle may be further increased by using a reflective means, such as mirror 42, to return light beam 20 back through the deflector. However, it is then desirable to separate the incident and exiting beams at face 15. This separation is achieved by slightly tilting mirror 42 from the direction normal to the plane of the drawing.

FIGURES 5 and 6 illustrate two alternative approaches for providing a 45° angle of refraction at face 15. The approach illustrated in FIGURE 5 utilizes a right triangular light transparent prism, generally designated 50, having an index of refraction similar to the parallelepipeds composing body 10. Prism 50 is of sufficient size to cover face 15 and is placed contiguous face 15 as illustrated. The similarity in the indices of refraction eliminates refraction at face 15 and the fact that the light beam is incident normal to face 55 of prism 50 eliminates refraction at this face. The manner in which the light beam traverses the deflector is identical to the manner previously described in conjunction with FIGURE 4. As was the case in FIGURE 4, a reflective means may also be provided to return the light beam back through the deflector. In the embodiment shown, prism 50 is composed of material without E-O properties.

If it is desired to have prism 50 composed of material exhibiting an E-O effect, the preferred embodiment takes the form of the light transparent body, generally designated 10′, illustrated in FIGURE 6. This embodiment further increases the O.P.D. between the two extreme rays, and eliminates the problem of providing an optical contact between prism 50 and parallelepipeds 11 and 12. As illustrated, non-parallelepiped regions 61 and 62 have substantially identical trapezoidal cross-sections, whereas parallelepiped regions 63 and 64 have substantiially identical square cross-sections. Furthermore, first face 65 and second face 66 intersect each other substantially at a right angle and intersect fifth face 69 and third face 67, respectively, at an obtuse angle. Substantially parallel faces 67 and 69 intersect fourth face 68 at a right angle. The orientation of each region's C-axis is identical to that already deescribed in conjunction with FIGURE 1. That is, if the crystallographic C-axis of non-parallelepiped 62 and parallelepiped 62 and parallelepiped 64 is into the drawing, then the C-axis of non-parallelepiped 61 and parallelepiped 63 is out of the drawing. Application of an electric field by electrodes covering the entire base area change the indices of refraction of the regions as previously described. Thus. the light beam is incident upon first face 65 and is redirected by reflective coatings 71, 72 and 73. The light beam is deflected each time it passes from one region to an adjacent region and exits the body through fifth face 66. Since the oppositely disposed extreme rays follow paths having different indices of refraction for nearly their entire traversal of the body, the O.P.D. is again maximized. Alternatively, the four regions composing the body do not have to be distinct. Then analogous to the principle described in conjunction with FIGURE 1, the area corresponding to the cross-sectional area of regions 62 and 64 is electroded whereas the area corresponding to the cross-sectional area of regions 61 and 63 is not electroded.

In FIGURE 7, a plurality of deflectors, generally designated 10a 10b, . . . 10n are shown in an array which provides cumulative deflection. The deflectors composing this array are identical to those described in conjunction with FIGURE 4 except for the omission of reflective coating 30 on all the deflectors except 10n. The omission of reflective coating 30 allows the light beam to traverse all the deflectors in the array until intercepted by reflective coating 30n which returns the light beam back through the array.

Extreme ray 20a is shown traversing the array of deflectors in an undeflected state. However, when an electric field is applied to one or more of the deflectors in the array, the incident light beam is deflected as it traverses the array. The deflection is achieved by a manner previously described. The light beam is directed through the array by reflective coating 19a, 40a, 40b, 19b, 40n as illustrated. To maximize the O.P.D. between the two extreme rays, parallelepipeds 13a and 12b must have the same C-axis orientation. This is also true for parallelepiped 14a and 11b. Thus, the boundary between parallelepipeds 13a and 12b and between parallelepipeds 14a and 11b can be eliminated. This applies also to the boundaries between the parallelepipeds in the array which correspond to these regions, such as the boundaries between regions 13b and 12n and regions 14b and 11n in the array shown.

The cumulative deflector illustrated in FIGURE 7 does not have to be an array of E-O crystals, but instead may be a single crystalline body having the same shape as the array. This embodiment utilizes the partial electroding technique previously described in conjunction with FIGURE 1. Using this technique, the regions corresponding to the square base area of parallelepipeds 12, 14a, 11b, 13b . . . 12n and 14n are electroded while the regions corresponding to the square base area of parallelepipeds 11a, 13a, 12b, 14b . . . 11n and 13n, are not electroded. Following this procedure, extreme rays 20a and 20b again have different indices of refraction for nearly their entire traversal of the crystal. While this technique reduces the number of resolvable spots and total deflection angle obtainable from a given volume of crystal, it eliminates the expense incurred polishing surfaces to provide an optical contact between the parallelepiped regions composing the separate detectors and also between the deflectors composing the array.

The embodiments illustrated in FIGURES 1 through 7 may utilize many different types of E-O material. For example, material having 3m symmetry, such as lithium niobate ($LiNBO_3$), and lithium tantalate ($LiTaO_3$), can be used in these embodiments. As previously suggested, material having a quadratic E-O affect, such as material having m3m symmetry like lead magnesium niobate ($Pb_3MgNb_2O_9$) may also be used.

The light reflective means has been described as reflective coatings on the appropriate parallelepiped faces. However, any reflection means, such as properly located mirrors or simply total internal reflection when the prism is surrounded by a material with an appropriate index of refraction will suffice. A further refinement without departing from the spirit of the invention may include a system of lenses to increase the effectiveness of the deflector for focusing the light beam. Also, a half-silvered mirror or optical circulator to separate the incident and deflective rays when required may be used.

It is to be understood that this invention has been disclosed with reference to a series of preferred embodiments and it is possible to make changes in form and detail without departing from the spirit and scope of the invention.

The embodiments of the invention in which an exclusive property or right is claimed are defined as follows:

1. A light beam deflector comprising:
    a light transparent body composed of first, second, third and fourth regions, said body including at least first, second, third and fourth faces wherein;
        said first and third regions are each adjacent said second and said fourth regions,
        at least one of said regions has an electric field dependent index of refraction; and
        said first face is adapted to transmit an incident light beam into said body;
    means for establishing a predetermined path within said body for a light beam incident thereon, said path traversing said first, second, third and fourth regions, and
    means for applying an electric field to at least one of said regions having an electric field dependent index of refraction, whereby the index of reflection of at least one of said regions is changed and the light beam traversing said regions is deflected.

2. The deflector of claim 1 wherein said regions are arranged to provide a first path haviing substantially a first index of refraction for first rays of the light beam and to provide a second path having substantially a second index of refraction for second rays of the light beam when an electric field is applied to at least one of said regions.

3. The deflector of claim 2 wherein:
said regions are composed of substantially the same crystalline material, and
said electric field means includes separate electrodes on at least one of said regions.

4. The deflector of claim 2 wherein:
said regions are composed substantially of material having a crystallographic C-axis;
each of said regions are positioned with respect to adjacent regions to provide opposite C-axis orientation,
said electric field means provide said electric field along at least one of said C-axes, thereby changing the index of refraction of at least one of said regions.

5. The deflector of claim 2 wherein said means for establishing a path for an incident light beam include light directing means adjacent said second face for redirecting the light beam toward said third face, said first and second faces being adjacent faces of said body.

6. The deflector of claim 5 wherein said means for establishing a path for an incident light beam include light directing means adjacent said third face for redirecting the light beam toward said fourth face, said second and third faces being adjacent one another.

7. The deflector of claims 6 wherein said means for establishing a path for a light beam includes light directing means adjacent said fourth face for redirecting the light beam toward said first face, said third and fourth faces being adjacent one another.

8. The light beam deflector of claim 7 wherein:
said body is in the form of a rectangular parallelepiped having first and second square bases;
said regions composing said parallelepiped are distinct media in the form of substantially identical rectangular parallelepipeds each having square first and second bases;
said first face is adapted to transmit a light beam into and out of said body, and
light directing means are reflective coatings on said second, third and fourth faces.

9. The light beam deflector of claim 8 including a light transparent crystal in the form of a right triangular prism wherein:
said crystal has an index of refraction similar to said parallelepiped, and
said crystal is placed contiguous said first face of said parallelepiped whereby the light beam is incident substantially normal to said prism.

10. The light beam deflector of claim 2 wherein:
said body includes a fifth face;
said means for establishing a path include said first face adapted to transmit a light beam into said body, said second face adapted to transmit a light beam out of said body wherein said first and second faces are adjacent faces of said body, and light directing means adjacent said third, fourth and fifth faces for redirecting the light beam traversing said body.

11. The light beam deflector of claim 10 wherein:
said first and second regions are distinct media having substantially identical trapezoidal cross sections;
said third and fourth regions are distinct media in the form of substantially identical first and second rectangular parallelepipeds, respectively, each having first and second square bases;
said first and second faces of said body intersect said third and fifth faces respectively at an obtuse angle and said first and second faces interest each other substantially perpendicular;
said third and fifth faces of said composite body are substantially parallel to each other and intersect said fourth face substantially perpendicularly, and
said light directing means reflective coatings on said third, fourth and fifth faces.

12. An array of light beam deflectors defined in claim 1 wherein a plurality of said deflectors are positioned and arranged adjacent each other to provide cumulative deflection of incident light.

References Cited

UNITED STATES PATENTS

| | | |
|---|---|---|
| 2,692,952 | 10/1954 | Briggs. |
| 3,305,292 | 2/1967 | Miller. |
| 3,320,013 | 5/1967 | Johnson. |
| 3,295,912 | 1/1967 | Fleisher et al. |
| 3,339,151 | 8/1967 | Smith. |
| 3,437,400 | 4/1969 | Rosenberg. |
| 3,450,460 | 6/1969 | Brown. |
| 3,458,247 | 7/1969 | Buhrer et al. |

RONALD L. WILBERT, Primary Examiner

E. BAUER, Assistant Examiner

U.S. Cl. X.R.

350—150